United States Patent
Farmer et al.

(10) Patent No.: US 9,209,501 B2
(45) Date of Patent: Dec. 8, 2015

(54) ENERGY STORAGE MANAGEMENT SYSTEM WITH DISTRIBUTED WIRELESS SENSORS

(71) Applicant: Lawrence Livermore National Security, LLC, Livermore, CA (US)

(72) Inventors: Joseph C. Farmer, Tracy, CA (US); Todd M. Bandhauer, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 345 days.

(21) Appl. No.: 13/900,434

(22) Filed: May 22, 2013

(65) Prior Publication Data

US 2013/0314242 A1    Nov. 28, 2013

Related U.S. Application Data

(60) Provisional application No. 61/650,359, filed on May 22, 2012, provisional application No. 61/650,649, filed on May 23, 2012.

(51) Int. Cl.

| G08C 19/16 | (2006.01) |
|---|---|
| H01M 10/63 | (2014.01) |
| G08C 17/02 | (2006.01) |
| H01M 10/613 | (2014.01) |
| H01M 10/656 | (2014.01) |
| H01M 10/6556 | (2014.01) |
| H01M 10/6568 | (2014.01) |
| H01M 10/6551 | (2014.01) |
| H01M 10/052 | (2010.01) |
| H01M 10/48 | (2006.01) |

(52) U.S. Cl.
CPC .......... *H01M 10/502* (2013.01); *G08C 17/02* (2013.01); *H01M 10/5004* (2013.01); *H01M 10/5061* (2013.01); *H01M 10/613* (2015.04); *H01M 10/6551* (2015.04); *H01M 10/6556* (2015.04); *H01M 10/6568* (2015.04); *H01M 10/052* (2013.01); *H01M 10/486* (2013.01); *H01M 2200/00* (2013.01); *Y02T 10/7011* (2013.01)

(58) Field of Classification Search
CPC ........ H04Q 5/22; H01M 10/48; G06F 17/30; H02J 7/04; F01D 15/10
USPC ........... 340/870.01, 10.51; 429/22, 90; 726/2; 320/137; 290/52
See application file for complete search history.

(56) References Cited

U.S. PATENT DOCUMENTS 6,313,751 B1    11/2001  Whitmire et al.
8,399,115 B2 *   3/2013  Ellwanger ...................... 429/90

(Continued)

OTHER PUBLICATIONS

International Search Report and Written Opinion for PCT/US14/039201 corresponding to U.S. Appl. No. 13/900,434, 14 pages.

*Primary Examiner* — Kerri McNally
*Assistant Examiner* — Renee Dorsey
(74) *Attorney, Agent, or Firm* — Eddie E. Scott

(57) ABSTRACT

An energy storage system having a multiple different types of energy storage and conversion devices. Each device is equipped with one or more sensors and RFID tags to communicate sensor information wirelessly to a central electronic management system, which is used to control the operation of each device. Each device can have multiple RFID tags and sensor types. Several energy storage and conversion devices can be combined.

7 Claims, 2 Drawing Sheets

(56) References Cited

U.S. PATENT DOCUMENTS

| | | |
|---|---|---|
| 2006/0019135 A1* | 1/2006 | Curello et al. .................. 429/22 |
| 2006/0253894 A1* | 11/2006 | Bookman et al. ................. 726/2 |
| 2007/0090808 A1* | 4/2007 | McCabe et al. ............... 320/137 |
| 2009/0220827 A1 | 9/2009 | Knaggs et al. |
| 2010/0114511 A1 | 5/2010 | Stewart |
| 2011/0127954 A1 | 6/2011 | Walley et al. |
| 2012/0182132 A1* | 7/2012 | McShane et al. .......... 340/10.51 |
| 2013/0241203 A1* | 9/2013 | Kleen et al. ..................... 290/52 |

\* cited by examiner

ENERGY STORAGE MANAGEMENT SYSTEM WITH DISTRIBUTED WIRELESS SENSORS

CROSS-REFERENCE TO RELATED APPLICATIONS

This application claims benefit under 35 U.S.C. §119(e) of U.S. Provisional Patent Application No. 61/650,359 titled May 22, 2012 entitled "Thermally Integrated Fire Suppression System for Lithium-Ion Battery Packs" and U.S. Provisional Patent Application No. 61/650,649 filed May 23, 2012 entitled "Lithium Ion Battery Management System with Distributed Wireless & Fiber Optic Sensors, and Embedded Fire Suppression System. The disclosure of U.S. Provisional Patent Application No. 61/650,359 and No. 61/650,649 are hereby incorporated herein by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to energy storage and more particularly to an energy storage system having multiple different types of energy storage and conversion devices.

2. State of Technology

Lithium-ion batteries fail violently, especially when connected in large series parallel arrangements for battery packs. Many recent commercial and military events have shown the destructive power of these cells during thermal events. The key to mitigating thermal runaway is to stop the failing cell early by removing heat generated by the cell during one of these events, which include internal shorting, external shorting, overcharging, or some form of destroying the cell via force. Currently, the only means for containing an event is to douse the battery with hand held fire extinguisher.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from, this description and by practice of the invention. The scope of the invention is not intended to be limited to the particular forms disclosed and the invention covers all modifications, equivalents, and alternatives falling within the spirit and scope of the invention as defined by the claims.

The present invention provides an energy storage system consisting of multiple different types of energy storage and conversion devices. Each device is equipped with one or more sensors and RFID tags to communicate sensor information wirelessly to a central electronic management system, which is used to control the operation of each device. Each device can have multiple RFID tags and sensor types. Several energy storage and conversion devices can be combined, including but not limited to: batteries, capacitors, fuel cells, flywheels, internal combustion engine, gas turbines, and/or multiple different types of each.

This system is used when multiple different types of energy storage and conversion systems are required to meet a range of operation conditions. For example, in an electric vehicle, capacitors can be used to deliver/absorb high-rate pulses (seconds) of energy, while a lithium-ion battery is used for delivering larger amounts of energy or a longer period of time (minutes to hours).

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of die specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
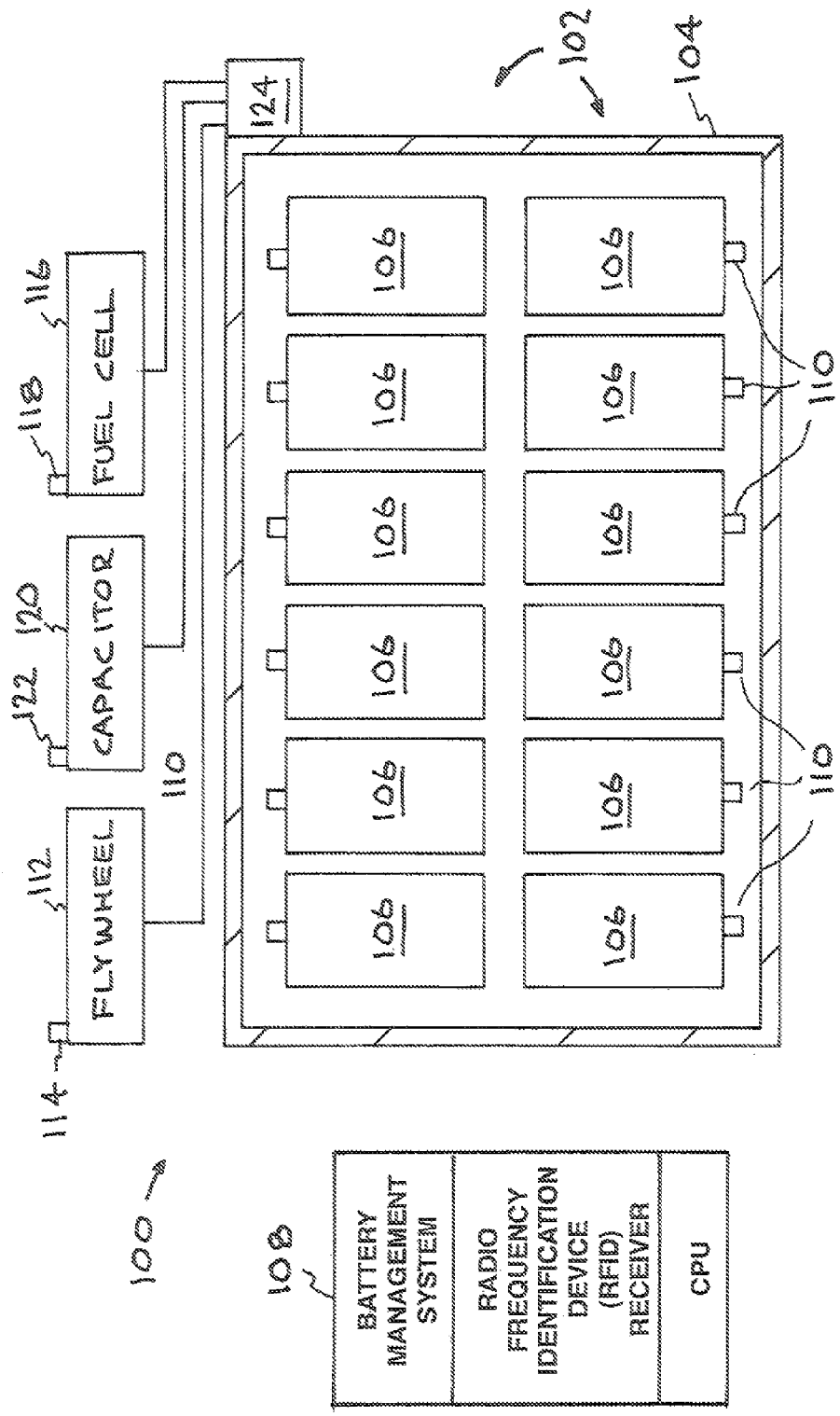
FIG. 1 illustrates the components of one embodiment of an energy storage management system of the present invention.

Referring to the drawings, to the following detailed description, and to incorporated materials, detailed information about the invention is provided Including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings and in particular to FIG. 1, the components of one embodiment of an energy storage management system, of the present invention are illustrated. The energy storage management system is designated generally by the reference numeral 100. The energy storage management system 100 provides an energy storage system having multiple different types of energy storage and conversion devices. Each device is equipped with one or more sensors and RFID tags to communicate sensor information wirelessly to a central electronic management system, which is used to monitor and control the operation of each device. Each, device can have multiple RFID tags and sensor types. Several energy storage and conversion devices can be combined, including, but not limited to: batteries, capacitors, fuel cells, flywheels, internal combustion engine, gas turbines, and/or multiple different types of each.

As illustrated in FIG. 1, an apparatus monitors parameters of an energy storage system including a battery pack 102 in a housing 104 that includes a multiplicity of individual battery cells 106. A multiplicity of battery radio frequency identification and sensor units 110 are connected to each of the individual battery cells 106. The radio frequency identification and sensor units 110 operating to sense parameters of each individual battery, cell 106 and provide radio frequency transmission of the parameters of each individual battery cell.

Also illustrated in FIG. 1 are a flywheel unit 112, a fuel cell unit 116, a capacitor unit 120, and a system connect 124. A fly wheel radio frequency identification and sensor unit 114 is connected to the fly wheel unit 112. The fly wheel radio frequency identification and sensor unit 114 operates to sense parameters of the fly wheel unit 112 and provide radio frequency transmission of the parameters of the fly wheel unit 112. A fuel cell radio frequency identification and sensor unit 118 is connected to the fuel cell unit 116. The fuel cell radio frequency identification and sensor unit 118 operates to sense parameters of the fuel cell unit 116 and provide radio frequency transmission of the parameters of the fuel cell 116. A capacitor radio frequency identification and sensor unit 122 is connected to the capacitor unit 120. The capacitor radio frequency identification and sensor unit 122 operates to sense parameters of the capacitor unit 120 and provide radio frequency transmission of the parameters of the capacitor unit 120. A management system 108 monitors the battery radio frequency identification transmissions, the fly wheel radio frequency identification transmissions, the fuel cell radio frequency identification transmissions, and the capacitor radio frequency identification transmissions for monitoring parameters of the energy storage system 100.

The structural components of the energy storage management system 100 having been described the operation of the energy storage management system 100 will now be considered. The energy storage management system 100 includes the steps of providing a battery energy storage unit having multiplicity of individual battery cells 106. Associating an individual battery radio frequency identification and sensor unit 110 with each individual battery cell. Using the individual battery radio frequency identification and sensor unit to sense battery parameters of the individual battery cells and provide battery radio frequency transmissions of the battery parameters. Providing at least one additional energy storage unit (112, 116, 120). Associating an individual additional energy storage unit radio frequency identification and sensor unit with the additional energy storage unit. Using the additional energy storage unit radio frequency identification and sensor unit to sense parameters of the additional energy storage unit and provide additional energy storage unit radio frequency transmissions. Monitoring the battery radio frequency transmissions and the additional energy storage unit radio frequency transmissions.

The energy storage management system 100 can be used when multiple different types of energy storage and conversion systems are required to meet a range of operation conditions. For example, in an electric vehicle, capacitors can be used to deliver/absorb high-rate pulses (seconds) of energy, while a lithium-ion battery is used for delivering larger amounts of energy or a longer period of time (minutes to hours). The energy storage management system 100 utilizes distributed addressable wireless sensors to directly measure several key operating parameters of lithium ion cells and battery packs that can be utilized to control their operation and serve as early indicators of the onset of thermal runaway. The specific cell parameters include voltage, temperature, and strain, which the latter serves as a proxy for internal cell pressure. Applicant has developed a prototype version of this system, which has demonstrated wireless transmission data. By using very low profile sensors, every cell in the final battery deliverable can have its voltage, temperature, and sidewall strain monitored wireless. As a result of having a higher fidelity in the number of sensing points, the operation of the system 100 includes extensive monitoring to enable safe operation of very high energy density cells in a high packing factor. In addition, using sensors on the different energy storage systems and communicating this information wirelessly enables enhanced scalability, which can be facilitated by multiplexing this technology.

The energy storage management system's 100 deployment of large lithium-ion battery packs are made safer and more reliable by increasing the number of sensing points. By communicating this information wirelessly, the delivered hybrid energy storage system will monitor every module and sub module without the need for large bundles of cables to carry sensor signals to the energy management system. By Increasing the number of sensors through the use of the wireless system, Applicant anticipates being able to safely deploy much higher energy density systems with increased modularity and the ability to extract performance information without any modifications or the utilization of additional cumbersome DAQ hardware. Finally, the by communicating wirelessly between the energy storage and management system, the system 100 will have greater flexibility to deploy multiple different types of energy storage systems in the most optimal arrangement.

Figure 2:
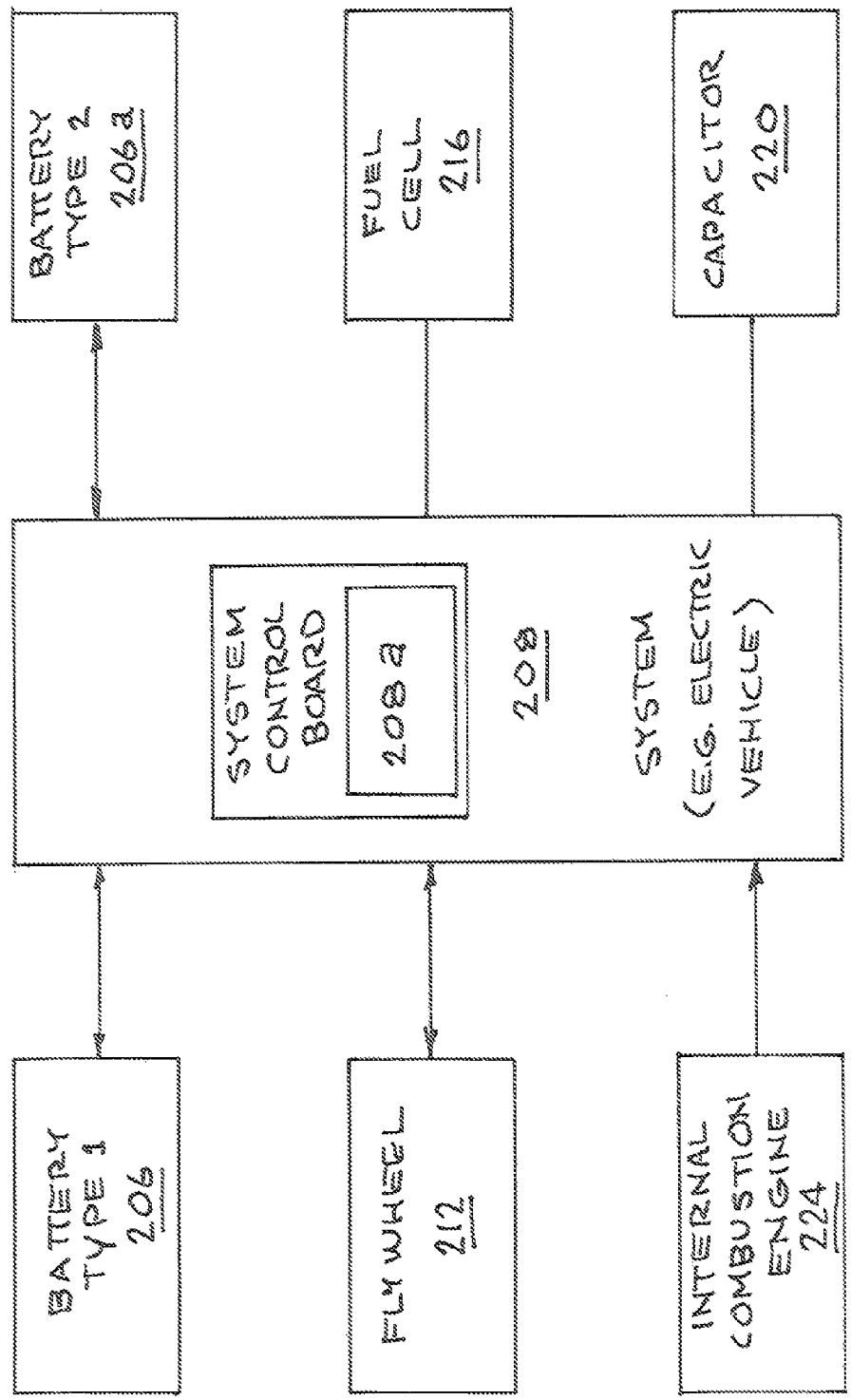
FIG. 2 illustrates the components of another embodiment of an energy storage management system of the present invention.

Referring now to the drawings and in particular to FIG. 2, the components of another embodiment of an energy storage management system of the present invention are illustrated. The energy storage management system is designated generally by the reference numeral 200. The energy storage management system 200 provides an energy storage system having multiple different types of energy storage and conversion devices. Each device is equipped with one or more sensors and RFID tags to communicate sensor information wirelessly to a central electronic management system, which is used to monitor and control the operation of each device. Each device can have multiple RFID tags and sensor types. Several energy storage and conversion devices can be combined, including, but not limited to: batteries, batteries, capacitors, fuel cells, flywheels, internal combustion engine, gas turbines, and/or multiple different types of each.

As illustrated in FIG. 2, an apparatus monitors parameters of an energy storage system including a battery type 1 (206) and a battery type 2 (206a) that includes a multiplicity of individual battery cells. A multiplicity of battery radio frequency identification and sensor units 210 and 210a are connected to each of the individual battery cells. The radio frequency identification and sensor units 210 and 210a operating to sense parameters of each individual battery cell and provide radio frequency transmission of the parameters of each individual battery cell.

Also illustrated in FIG. 2 are a flywheel unit 212, a fuel cell unit 216, a capacitor unit 220, and an internal combustion engine 224. A fly wheel radio frequency identification and sensor unit 214 is connected to the fly wheel unit 212. The fly wheel radio frequency identification and sensor unit 214 operates to sense parameters of the fly wheel unit 212 and provide radio frequency transmission of the parameters of the fly wheel unit 212. A fuel cell radio frequency identification and sensor unit 218 is connected to the fuel cell unit 216. The fuel cell radio frequency identification and sensor unit 218 operates to sense parameters of the fuel cell unit 216 and provide radio frequency transmission of the parameters of the fuel cell 216. A capacitor radio frequency identification and sensor unit 222 is connected to the capacitor unit 220. The capacitor radio frequency identification and sensor unit 222 operates to sense parameters of the capacitor unit 220 and provide radio frequency transmission of the parameters of the capacitor unit 220. A radio frequency identification and sensor unit 226 is connected to the internal combustion engine 224. The radio frequency identification and sensor unit 226 operates to sense parameters of the internal combustion engine 224 and provide radio frequency transmission of the parameters of the internal combustion engine 224.

A management system 208 and 208a monitors the battery radio frequency identification transmissions, the fly wheel radio frequency identification transmissions, the fuel cell radio frequency identification transmissions, and the capacitor radio frequency identification transmissions for monitoring parameters of the energy storage system 200.

The structural components of the energy storage management system 200 having been described the operation of the energy storage management system 200 will now be considered. The energy storage management system 200 includes the steps of providing a battery energy storage unit having multiplicity of individual battery cells 206. An individual battery radio frequency identification and sensor unit 210 is associated with each individual battery cell. The individual battery radio frequency identification and sensor unit is used to sense battery parameters of the individual battery cells and provide battery radio frequency transmissions of the battery parameters. In the system, at least one additional energy storage unit is provided (212, 216, 220, 224), and each individual additional energy storage unit is associated with a radio frequency identification and sensor unit (214, 218, 222, and 226 respectively). These additional energy storage unit radio frequency identification and sensor units sense parameters of the additional energy storage unit and provide additional energy storage unit radio frequency transmissions, while monitoring both the battery radio frequency transmissions and the additional energy storage unit radio frequency transmissions.

Although the description above contains many details and specifics, these should not be construed as limiting die scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features, that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some eases be excised from the combination, and the claimed combination may be directed to a sub combination or variation of a sub combination. Similarly, while operations are depicted in the drawings in a particular order, this should not be understood as requiring that such operations be performed in the particular order shown or in sequential order, or that ail illustrated operations be performed, to achieve desirable results. Moreover, the separation of various system components in the embodiments described above should not be understood as requiring such separation in ail embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to tire elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claim is:

1. An energy storage apparatus and system for monitoring parameters of an energy storage system, comprising:
    a management system for monitoring the parameters of the energy storage system;
    a battery pack connected to said management system, wherein said battery includes a multiplicity of individual battery cells;
    a multiplicity of battery radio frequency identification and sensor units wherein an individual battery radio frequency identification and sensor unit is connected to each of said individual battery cells, said radio frequency identification and sensor unit operating to sense the parameters of each individual battery cell and provide radio frequency transmission of said parameters of each individual battery cell to said management system;
    a capacitor;
    a capacitor radio frequency identification and sensor unit connected to said capacitor, said capacitor radio frequency identification and sensor unit operating to sense the parameters of said capacitor and provide radio frequency transmission of the parameters of said capacitor to said management system;
    a fuel cell; and
    a fuel cell radio frequency identification and sensor unit connected to said fuel cell, said fuel cell radio frequency identification and sensor unit operating to sense the parameters of said fuel cell and provide radio frequency transmission of the parameters of said fuel cell to said management system;
    wherein said management system monitors
    said battery radio frequency identification transmissions,
    said capacitor radio frequency identification transmissions, and
    said fuel cell radio frequency identification transmissions.

2. The energy storage apparatus and system for monitoring parameters of an energy storage system of claim 1 further comprising a fly wheel unit and a fly wheel radio frequency identification and sensor unit connected to said fly wheel unit, said fly wheel radio frequency identification and sensor unit operating to sense parameter of said fly wheel unit and provide radio frequency transmissions of the parameters of said fly wheel unit; wherein said management system further monitors said fly wheel radio frequency identification transmissions.

3. An energy storage apparatus and system for monitoring parameters of an energy storage system, comprising:
- a management system for monitoring the parameters of the energy storage system;
- a battery pack operatively connected to said management system, wherein said battery pack includes a multiplicity of individual battery cells;
- a multiplicity of battery radio frequency identification and sensor units connected to each of said individual battery cells, each said radio frequency identification and sensor unit operating to sense parameters of each individual battery cell and provide radio frequency transmission of said parameters of each individual battery cell;
- a fly wheel unit operatively connected to said management system,
- a fly wheel radio frequency identification and sensor unit connected to said fly wheel unit, said fly wheel radio frequency identification and sensor unit operating to sense parameters of said fly wheel unit and provide radio frequency transmission of said parameters of said fly wheel unit;
- a fuel cell operatively connected to said management system,
- a fuel cell radio frequency identification and sensor unit connected to said fuel cell, said fuel cell radio frequency identification and sensor unit operating to sense parameters of said fuel cell and provide radio frequency transmission of said parameters of said fuel cell;
- a capacitor operatively connected to said management system, and
- a capacitor radio frequency identification and sensor unit connected to said capacitor, said capacitor radio frequency identification and sensor unit operating to sense parameters of said capacitor and provide radio frequency transmission of said parameters of said capacitor;

wherein said management system monitors
said battery radio frequency identification transmissions,
said fly wheel radio frequency identification transmissions,
said fuel cell radio frequency identification transmissions, and
said capacitor radio frequency identification transmissions, and transmits said battery radio frequency identification transmissions, said fly wheel radio frequency identification transmissions, said fuel cell radio frequency identification transmissions, and said capacitor radio frequency identification transmissions to said management system for monitoring parameters of the energy storage system.

4. The energy storage apparatus and system for monitoring parameters of an energy storage system of claim 3 wherein said parameters of each individual battery cell include temperature of each said individual battery cell.

5. The energy storage apparatus and system for monitoring parameters of an energy storage system m of claim 3 wherein said parameters of each individual battery cell include voltage of each said individual battery cell.

6. The energy storage apparatus and system for monitoring parameters of an energy storage system of claim 3 wherein said parameters of each individual battery cell include strain parameters of each said individual battery cell.

7. The energy storage apparatus and system for monitoring parameters of an energy storage system of claim 3 wherein said parameters of each individual battery cell include temperature, voltage, and strain parameters of each said individual battery cell.

* * * * *